United States Patent
Gassion et al.

(10) Patent No.: US 9,578,685 B2
(45) Date of Patent: Feb. 21, 2017

(54) COMMUNICATION GATEWAY AND COMMUNICATION SYSTEM INCLUDING SAID COMMUNICATION GATEWAY

(71) Applicant: SCHNEIDER ELECTRIC INDUSTRIES SAS, Rueil-Malmaison (FR)

(72) Inventors: Romain Gassion, Izeaux (FR); Olivier Coutelou, Grenoble (FR)

(73) Assignee: SCHNEIDER ELECTRIC INDUSTRIES SAS, Rueil-Malmaison (FR)

( * ) Notice: Subject to any disclaimer, the term of this patent is extended or adjusted under 35 U.S.C. 154(b) by 0 days.

(21) Appl. No.: 14/416,352

(22) PCT Filed: Jul. 5, 2013

(86) PCT No.: PCT/FR2013/051612
§ 371 (c)(1),
(2) Date: Jan. 22, 2015

(87) PCT Pub. No.: WO2014/037634
PCT Pub. Date: Mar. 13, 2014

(65) Prior Publication Data
US 2015/0223289 A1 Aug. 6, 2015

(30) Foreign Application Priority Data
Sep. 7, 2012 (FR) ...................... 12 58385

(51) Int. Cl.
*H04W 88/16* (2009.01)
*H04W 4/00* (2009.01)
(Continued)

(52) U.S. Cl.
CPC .......... *H04W 88/16* (2013.01); *G06K 19/0701* (2013.01); *G06K 19/0702* (2013.01);
(Continued)

(58) Field of Classification Search
CPC ...... H04W 4/008; H04W 84/18; H04W 88/16; G06K 19/0701; G06K 19/0702; G06K 19/0705; G06K 19/0707; G06K 19/07741
(Continued)

(56) References Cited

U.S. PATENT DOCUMENTS

| | | |
|---|---|---|
| 2001/0020241 A1* | 9/2001 | Kawamoto et al. ................. H04L 12/2803 |
| 2005/0134462 A1* | 6/2005 | Shelley ............. G06K 19/0702 340/572.8 |

(Continued)

FOREIGN PATENT DOCUMENTS

WO  WO 2008/011111 A2  1/2008

OTHER PUBLICATIONS

International Search Report issued Aug. 26, 2013 in PCT/FR2013/051612 Filed Jul. 5, 2013.

(Continued)

*Primary Examiner* — Michael Mapa
(74) *Attorney, Agent, or Firm* — Oblon, McClelland, Maier & Neustadt, L.L.P.

(57) ABSTRACT

A communication gateway including: a first communication interface for communicating, over a first communication network, with a mobile terminal; a second wireless communication interface for communicating, over a second communication network, with at least one external device. The communication gateway; an electrical energy recovery mechanism configured to recover electrical energy supplied by the mobile terminal; and a non-volatile memory powered by the electrical energy recovered and a microcontroller connected to the non-volatile memory and configured to exchange data with the mobile terminal over the first communication network and with the external device over the second communication network.

20 Claims, 3 Drawing Sheets

Figure 1:
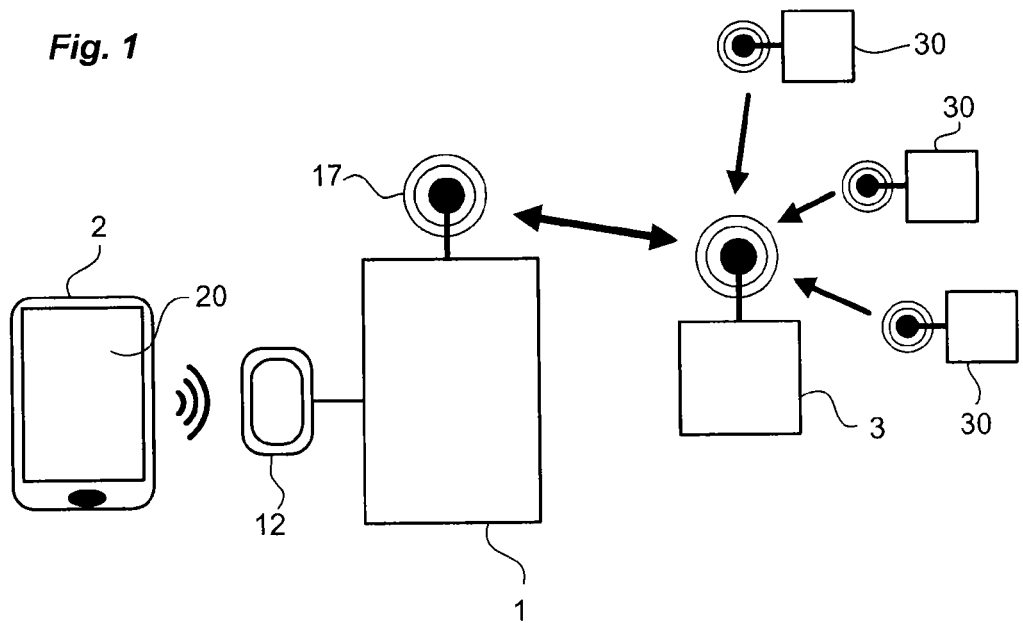

(51) Int. Cl.
*G06K 19/07* (2006.01)
*G06K 19/077* (2006.01)
*H04W 84/18* (2009.01)

(52) U.S. Cl.
CPC ..... *G06K 19/0705* (2013.01); *G06K 19/0707* (2013.01); *G06K 19/07741* (2013.01); *H04W 4/008* (2013.01); *H04W 84/18* (2013.01)

(58) Field of Classification Search
USPC ............. 455/41.1–41.2, 418–420, 426.1
See application file for complete search history.

(56) References Cited

U.S. PATENT DOCUMENTS

| | | | | |
|---|---|---|---|---|
| 2006/0026316 | A1* | 2/2006 | Milenkovic et al. | G06F 21/88 710/62 |
| 2007/0237316 | A1* | 10/2007 | Tanabe et al. | H04L 12/2818 379/102.03 |
| 2008/0019333 | A1 | 1/2008 | Kharia et al. | |
| 2008/0272889 | A1* | 11/2008 | Symons | H02J 7/025 340/10.1 |
| 2010/0068996 | A1* | 3/2010 | Haartsen | H04B 5/0025 455/41.1 |
| 2011/0054700 | A1 | 3/2011 | Chan et al. | |
| 2011/0127843 | A1* | 6/2011 | Karaoguz | G06K 7/10207 307/104 |
| 2011/0127844 | A1 | 6/2011 | Walley et al. | |
| 2011/0127952 | A1 | 6/2011 | Walley et al. | |
| 2011/0127953 | A1 | 6/2011 | Walley et al. | |
| 2011/0130093 | A1 | 6/2011 | Walley et al. | |
| 2012/0108230 | A1* | 5/2012 | Stepanian | G06F 21/10 455/422.1 |
| 2013/0084803 | A1* | 4/2013 | Hall | H04W 52/0277 455/41.1 |

OTHER PUBLICATIONS

French Preliminary Search Report issued Apr. 23, 2013 in Patent Application No. FR 1258385 Filed Sep. 7, 2012 (with English translation of categories of cited documents).
U.S. Appl. No. 14/389,903, filed Oct. 1, 2014 Meftah, et al.

* cited by examiner

COMMUNICATION GATEWAY AND COMMUNICATION SYSTEM INCLUDING SAID COMMUNICATION GATEWAY

TECHNICAL FIELD OF THE INVENTION

The present invention relates to a communication gateway and to a communication system including said communication gateway.

PRIOR ART

Today, with the goal of energy efficiency, homes are equipped with numerous sensors, such as for example humidity, light intensity, temperature, current, power or energy sensors. The majority of these sensors, organized as a meshed network, transmit data over a wireless communication network to a central processing unit. The wireless communication network relies for example on a protocol of the Zigbee or Zigbee Green Power type. In a network of sensors, a human-machine interface allows interaction with the sensors in order to configure them or to read their data. This human-machine interface uses a communication gateway adapted to the communication protocol employed, for example the Zigbee or Zigbee Green Power protocol. In order to communicate according to the various protocols, the same human-machine interface then needs to comprise several separate communication gateways. However, this type of human-machine interface is not very common. For example, the mobile telephones available on the market do not support communication protocols of the Zigbee or Zigbee Green Power type. Another possibility consists in providing separate human-machine interfaces to support the various types of protocols. The latter solution is not very practical or cost-effective. Furthermore, in order to operate, each huhuman-machine interface requires an electrical power supply source.

The aim of the invention is to provide a communication gateway allowing a user to easily interact with an external device, such as for example a sensor, without disposing of a huhuman-machine interface dedicated to the control of this device and without having to use an electrical power supply.

PRESENTATION OF THE INVENTION

This goal is attained by a communication gateway comprising a first communication interface for communicating, over a first communication network, with a mobile terminal and a second wireless communication interface for communicating, over a second communication network, with at least one external device, the communication gateway comprising:
  electrical energy recovery means arranged for recovering electrical energy supplied by the mobile terminal,
  a non-volatile memory powered by the electrical energy recovered and a microcontroller connected to the non-volatile memory and arranged for exchanging data with the mobile terminal over the first communication network and with the external device over the second communication network.

According to one feature, the first communication interface comprises an RF tag equipped with an antenna and operating according to a near-field communications technology or of the RFID type. According to the invention, the communication gateway comprises for example a support designed to receive said mobile terminal, said support incorporating said antenna.

According to another feature of the invention, the non-volatile memory is for example included in the RF tag.

According to another feature, the communication gateway comprises a power supply link between the RF tag, the microcontroller and the second communication interface.

According to the invention, the communication gateway comprises means for managing the electrical energy recovered by the electrical energy recovery means, said means for managing the electrical energy being arranged for powering the microcontroller and the second communication interface.

According to a first variant embodiment, the electrical energy recovery means comprise a photovoltaic module and means for storing the electrical energy connected to the means for managing the electrical energy.

According to a second variant embodiment, the electrical energy recovery means comprise an antenna arranged for powering the communication gateway by magnetic coupling.

Advantageously, the second communication interface comprises an electronic circuit operating according to a protocol of the Zigbee or Zigbee Green Power type and an antenna connected to said electronic circuit.

The invention also relates to a communication system comprising:
  a mobile terminal comprising a communication interface for communicating over a first communication network and an electrical power supply interface for providing a supply of electrical energy,
  at least one external device comprising a wireless communication interface for communicating over a second communication network,
  a communication gateway comprising a first communication interface for communicating with the mobile terminal over the first communication network and a second wireless communication interface for communicating with the external device over the second communication network,
  the communication gateway comprising:
  means for recovering electrical energy supplied by the electrical power supply interface of the mobile terminal,
  a non-volatile memory powered by the electrical energy recovered and a microcontroller connected to the non-volatile memory and arranged for exchanging data with the mobile terminal over the first communication network and with the external device over the second communication network.

According to one feature, the mobile terminal comprises a reader/encoder operating in near-field mode or in RFID mode.

According to another feature, the non-volatile memory stores a unique identifier of the communication gateway and in that the mobile terminal associates a software application dedicated to the control, the reading and/or the monitoring of the external device with the unique identifier stored in the non-volatile memory of the communication gateway.

According to another feature, the mobile terminal comprises a human-machine interface allowing the control, the reading and/or the monitoring of the external device.

According to another feature, the external device comprises a sensor or a coordination unit connected to several sensors.

According to another feature, the non-volatile memory is arranged for storing in memory a unique identifier for the mobile terminal and for associating access rights with it.

BRIEF DESCRIPTION FIGURES

Figure 2A:
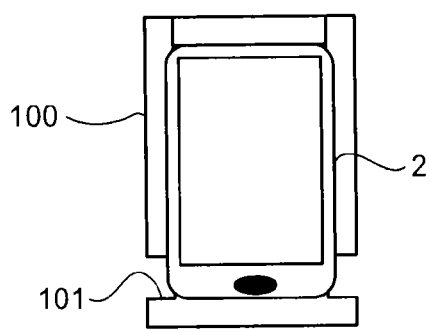
Figure 2B:
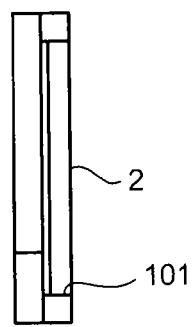
Figure 3A:
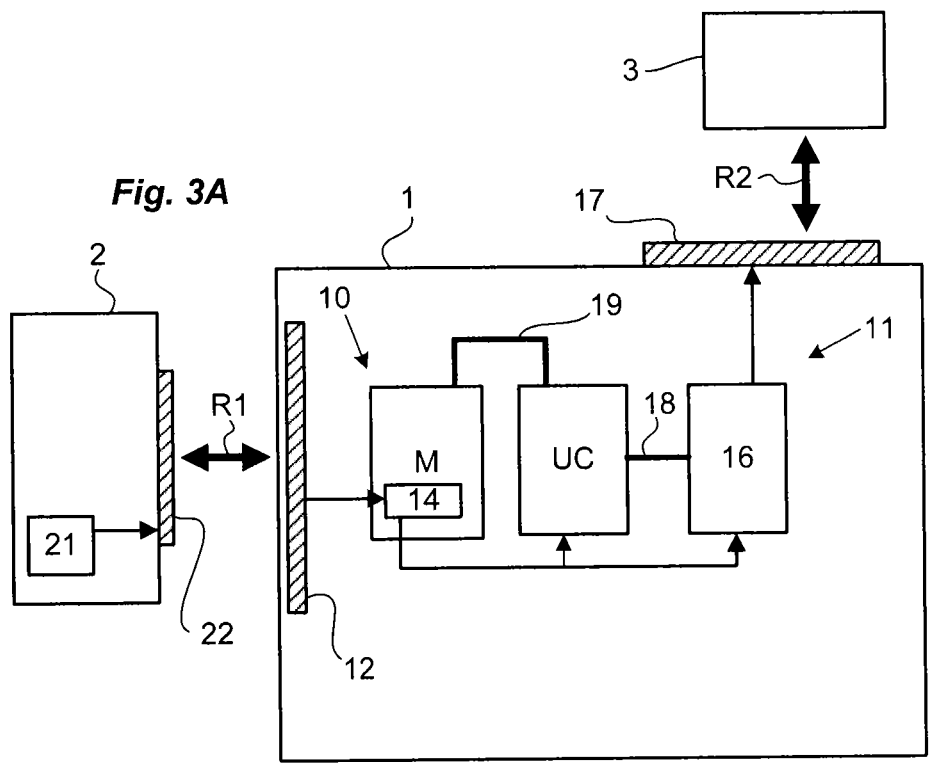
Figure 3B:
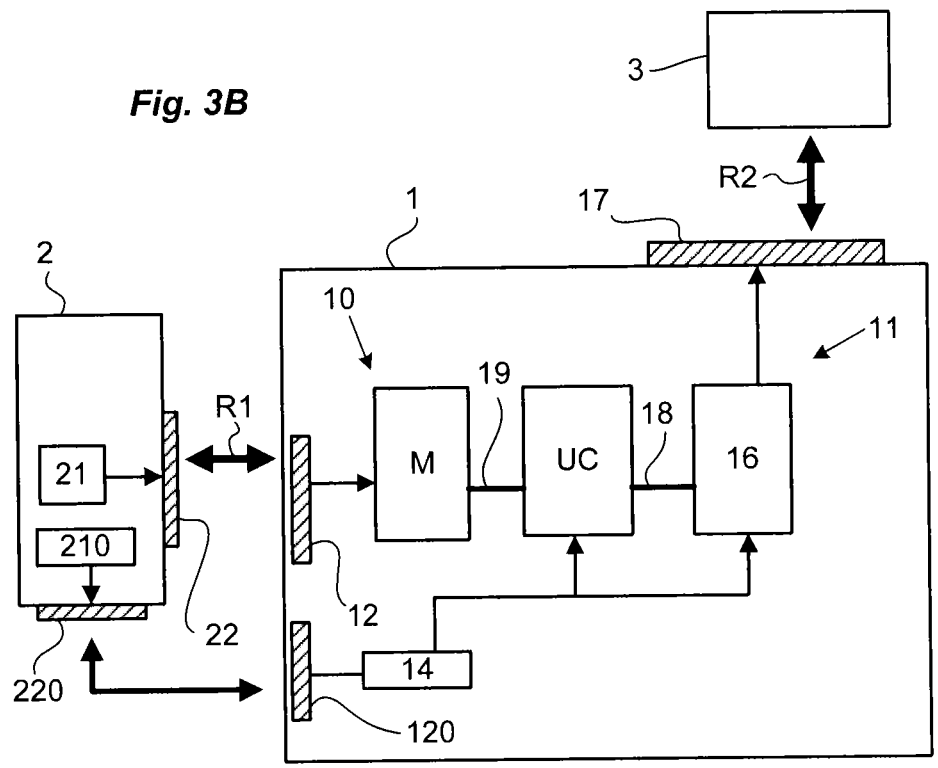
Figure 3C:
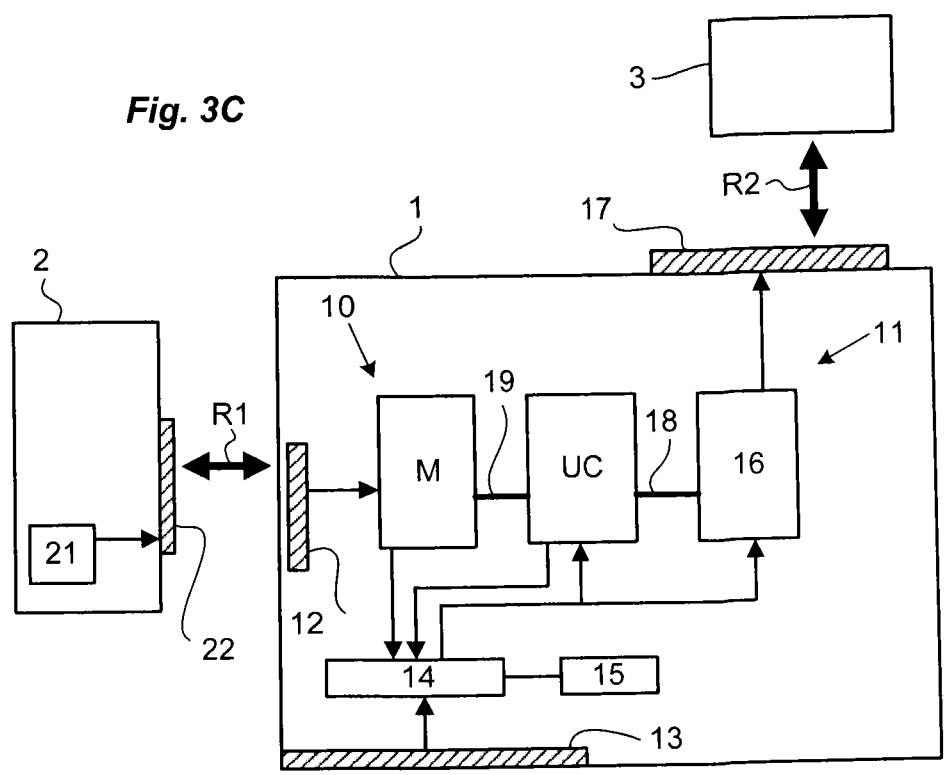

Other features and advantages will become apparent in the detailed description that follows presented with reference to the appended drawings, in which:

FIG. 1 shows the communication system of the invention, comprising a mobile terminal, a communication gateway and a network of sensors, FIGS. 2A and 2B show, respectively in a front view and a side view, one exemplary embodiment of the communication gateway of the invention, on which a mobile terminal is positioned, FIG. 3A shows schematically the architecture of the system of the invention according to a first embodiment, FIG. 3B shows schematically the architecture of the system of the invention according to a second embodiment, FIG. 3C shows schematically the architecture of the system of the invention according to a third embodiment.

DETAILED DESCRIPTION OF AT LEAST ONE EMBODIMENT

The invention relates to a communication gateway 1 employed to provide the exchange of data between a mobile terminal 2 and one or more external devices.

External device 3 is understood to mean for example one or more coordination devices or a coordination unit responsible for managing several devices. As shown in FIG. 1, the external device 3 is for example a coordination unit for a network of sensors 30 connected together. The sensors 30 are for example employed for recording data on humidity, light intensity, gas, temperature, current, power or energy, etc.

In the following part of the description, a communication will be considered to a single external device 3. The pairing between the communication gateway 1 and each external device is achieved by known methods.

The external device 3 comprises a wireless communication interface which enables data to be exchanged over a communication network, hereinafter denoted second communication network R2. This communication network operates for example according to a protocol of the Zigbee or Zigbee Green Power type.

The mobile terminal 2 is for example a mobile telephone of the "smartphone" type or a tablet. It comprises a human-machine interface 20 such as for example a touch screen. It also comprises a communications module which enables data to be exchanged over a communication network, hereinafter denoted first communication network R1. In addition to its communications module, the mobile terminal 2 is equipped with an electrical power supply module allowing a device present within its range to be powered. The communications module and the power supply module are for example installed together in a reader/encoder operating in near-field (or NFC for Near Field Communication) mode or in RFID (for Radio Frequency Identification) mode. In a known manner, this reader/encoder 21 comprises an antenna 22 via which it generates a magnetic field allowing an RF tag positioned within its range to be powered by magnetic coupling.

The mobile terminal 2 may also comprise another power supply and communications module 210 (FIG. 3B) enabling it to communicate over a wireless network such as a GSM, GPRS, WIFI or BlueTooth network, etc. This module 210 also comprises an antenna 220.

The mobile terminal 2 preferably comprises a dedicated software application allowing data to be exchanged with the external device 3. This software application is then configured for interacting with the external device 3 paired with the communication gateway 1. It is for example executed whenever the mobile terminal 2 has detected the presence of the communication gateway 1 and identified the communication gateway 1.

The determination of the software application to be executed is carried out on the basis of a unique identifier of the communication gateway 1. In the mobile terminal 2, the association between the unique identifier of the communication gateway 1 and the software application to be executed may be achieved in various ways. It may for example involve a setup implemented by the user during the first detection of the communication gateway 1 by the mobile terminal 2.

In order to control, read and/or configure each external device 3, the software application notably relies on the human-machine interface 20 of the mobile terminal.

Preferably, the mobile terminal 2 also comprises a unique identifier to which particular access rights may be attached. These access rights are for example managed by the communication gateway 1 which will only be able to establish a communication with an external device 3 if the user of the mobile terminal has the right to do this. A mobile terminal 2 having an administrator identifier may for example be employed for managing the access rights stored in memory in the communication gateway 1.

The communication gateway 1 is designed for a given application, for example the control of switches in a room, the monitoring of environmental sensors, the control of an HVAC ventilation system, the monitoring and the diagnostic of equipment in an electrical equipment room, the monitoring of the state of one or more electrical breakers, the reading of electrical energy or power sensors, etc.

The communication gateway 1 comprises a first communication interface 10 for communicating with the mobile terminal 2 over the first communication network R1, via an antenna 12, and a second communication interface 11 to enable communication with the external device 3 over the second communication network R2, via an antenna 17. The communication between the communication gateway 1 and the external device 3 could be implemented over one or more routers.

The communication gateway 1 also comprises processing means such as a microcontroller UC.

According to the invention, the communication gateway 1 does not comprise any internal electrical power supply source, in other words no non-rechargeable battery. The communication gateway 1 comprises means for recovering electrical energy arranged for powering its internal circuits.

As described hereinabove in conjunction with FIGS. 3A to 3C, the electrical energy recovery means may be multiple.

In the first embodiment shown in FIG. 3A, the communication gateway is powered by a magnetic coupling taking place between the NFC or RFID reader/encoder 21 of the mobile terminal 2 and the communication gateway 1.

In the second embodiment show in FIG. 3B, the communication gateway 1 is powered, via a first power supply channel, by a magnetic coupling implemented between the NFC or RFID reader/encoder 21 of the mobile terminal 2 and the communication gateway 1, and/or via a second power supply channel, by a magnetic coupling implemented between the communications and power supply module 210 of the mobile terminal (GSM, GPRS, WIFI, BlueTooth, etc.) and the communication gateway 1, via an antenna 120 of said gateway 1.

In the third embodiment shown in FIG. 3C, the communication gateway 1 is powered, via a first power supply channel, by a magnetic coupling between the NFC or RFID reader/encoder 21 of the mobile terminal 2 and the communication gateway 1 and/or, via a second power supply channel, by virtue of electrical energy generated by a converter, such as for example a photovoltaic module 13, and stored in suitable storage means.

Preferably, in order to recover the electrical energy by magnetic coupling with the NFC or RFID reader/encoder 21 of the mobile terminal 2, the first communication interface 10 is composed of an RF tag operating according to the NFC or RFID technology. It thus comprises a NFC or RFID chip comprising a non-volatile memory M, for example of the EEPROM type, and the antenna 12 designed to become magnetically coupled with the antenna 22 of the reader/encoder 21 included in the mobile terminal 2. The communication gateway 1 can thus be powered by the "carrier" emitted from the antenna 22 of the reader/encoder 21 of the mobile terminal 2. The energy picked up by the antenna 12 of the first communication interface 10 is transformed into electrical energy. The non-volatile memory M is for example directly powered by the electrical energy generated by the magnetic coupling. It is connected to the microcontroller UC by means of a bus 19 such as for example an I2C bus (for Inter-Integrated Circuit bus).

The communication gateway 1 may also comprise means 14 for managing the electrical energy recovered via the first communication interface 10 or via another power supply channel such as described hereinabove. The means 14 for managing the electrical energy are arranged in the communication gateway 1 in order to distribute the electrical energy to the components of the gateway, in other words mainly the microcontroller UC and the second communication interface 11.

In the first embodiment, the means 14 for managing the electrical energy are for example directly installed in the component forming the memory non-volatile M.

In the second embodiment, the means for managing the electrical energy are connected to the antenna 120 designed to pick up electrical energy generated by the communications and power supply module 210 of the mobile terminal 2.

In the third embodiment, the means 14 for managing the electrical energy are for example connected to the photovoltaic module 13 and to means 15 for storing the electrical energy recovered, for example capacitors or rechargeable batteries.

The NFC or RFID technology involves the storage of a unique identifier in the non-volatile memory M of the communication gateway 1. As described hereinabove, this unique identifier is associated, in the mobile terminal 2, with a software application to be executed on the mobile terminal 2. When the mobile terminal 2 is within range of the communication gateway 1, the mobile terminal 2 sends an initial request to the communication gateway in order to obtain the unique identifier from the gateway. In response, the communication gateway sends it its unique identifier stored in its non-volatile memory M. The mobile terminal 2 then executes the software application associated with this unique identifier.

The second communication interface 11 of the communication gateway 1 comprises an electronic circuit 16 of the radio transmitter/receiver type (IEEE 802.15.4, Zigbee, Zigbee Green Power) operating according to the protocol of the second communication network R2 and the antenna 17 connected to said electronic circuit 16. The electronic circuit 16 is connected to the microcontroller UC via a serial link 18; this allows messages coming from the external device 3 to be received via the second communication network R2 and data representative of said messages to be transferred to the microcontroller UC. Preferably, the second communication interface 11 operates according to a protocol of the Zigbee or Zigbee Green Power type. The communication gateway 1 thus allows a mobile terminal 2, not equipped with such an interface, to be able to communicate according to this protocol with the external device 3.

According to the invention, the communication gateway 1 is arranged for managing access rights to each external device 3 connected. As described hereinabove, the management of these access rights is for example implemented on the basis of the identifier of the mobile terminal 2 which is brought up. For example, depending on their access rights, users will only be able to gain access to the data from certain sensors associated with the communication gateway 1.

With reference to FIGS. 2A and 2B, the communication gateway 1 takes for example the form of a housing 100 comprising a support 101 designed to support the mobile terminal 2. The components of the gateway described hereinabove, in other words the first communication interface 10, the microcontroller UC, the second communication interface 11 and the means 14 for managing the electrical energy are accommodated within said housing 100. The microcontroller UC and the non-volatile memory M are preferably assembled on the same electronic board accommodated within the housing.

In the housing 100, the antenna 12 of the first communication interface 10 is preferably positioned under the location intended to receive the mobile terminal 2 in order to be able to generate a maximum magnetic coupling between the mobile terminal 2 and the communication gateway 1.

According to the invention, the support 101 is arranged to receive the mobile terminal 2 in a vertical position or in a horizontal position. It comprises for example an adjustment mechanism allowing the spacing of the support to be adapted to the size of the mobile terminal 2.

In the first embodiment shown in FIG. 3A, the principle of operation of the communication gateway 1 is as follows:

The mobile terminal 2 is brought up to the communication gateway 1. It is for example fixed onto the support 101 provided. The magnetic coupling between the reader/encoder 21 of the mobile terminal 2 and the antenna 12 of the first communication interface 10 of the communication gateway 1 allows the non-volatile memory M and the microcontroller UC to be powered.

Once the communication gateway 1 is powered, the latter establishes the list of devices with which it can communicate.

The mobile terminal 2 sends a request to the communication gateway 1 in order to obtain its unique identifier. In response to the request, the communication gateway 1 sends its unique identifier.

The mobile terminal 2 executes the software application associated with the unique identifier of the communication gateway 1.

The communication gateway 1 could potentially manage access rights on certain devices, taking into account the identifier of the mobile terminal 2 presented.

Using the software application executed on the mobile terminal 2 and via the first communication network R1, the mobile terminal writes a request into the non-volatile memory M of the communication gateway 1.

The microcontroller UC of the communication gateway 1 reads the request written into the non-volatile memory M and transmits it to the external device 3 by sending a command to the second communication interface 11.

The second communication interface 11 sends a message to the external device via the second communication network R2 and subsequently switches into in a reception mode, waiting for a response.

The external device 3 generates a response and transmits it to the communication gateway 1 via the second communication network R2.

The response received by the second communication interface 11 is read by the microcontroller UC and written in the non-volatile memory M.

If no response is transmitted by the external device 3 at the end of a given, for example pre-stored, period the microcontroller UC registers in the non-volatile memory M a message of absence of response.

The mobile terminal 2, still connected to the communication gateway 1 via the first communication network R1, reads the response stored in the non-volatile memory M and displays corresponding information on its human-machine interface 20.

The mobile terminal 2 stops the supply of energy to the communication gateway 1.

In the second embodiment shown in FIG. 3B, the principle of operation is as follows:

The mobile terminal 2 is brought up to the communication gateway 1. It is for example fixed onto the support 101 provided. By magnetic coupling between the reader/encoder 21 of the mobile terminal 2 and the antenna 12 of the first communication interface 10 of the communication gateway 1, the non-volatile memory M and the microcontroller UC are powered. The mobile terminal therefore powers the gateway via the first power supply channel.

Once the communication gateway 1 is powered, the latter establishes the list of the devices with which it is able to communicate.

The mobile terminal 2 sends a request to the communication gateway 1 in order to obtain its unique identifier. In response to the request, the communication gateway 1 sends its unique identifier.

The mobile terminal 2 executes the software application associated with the unique identifier of the communication gateway 1.

The communication gateway 1 could potentially manage access rights on certain devices, taking into account the identifier of the mobile terminal 2 presented.

Using the software application executed on the mobile terminal 2 and via the first communication network R1, the mobile terminal writes a request into the non-volatile memory M of the communication gateway 1.

The mobile terminal 2 cuts the first power supply channel.
The mobile terminal 2 powers the gateway via the second power supply channel.

The microcontroller UC of the communication gateway 1 reads the request written into the non-volatile memory M and transmits it to the external device 3 by sending a command to the second communication interface 11.

The second communication interface 11 sends a message to the external device via the second communication network R2 and subsequently switches into in a reception mode, waiting for a response.

The external device 3 generates a response and transmits it to the communication gateway 1 via the second communication network R2.

The response received by the second communication interface 11 is read by the microcontroller UC and written into the non-volatile memory M.

If no response is transmitted by the external device 3 at the end of a given, for example pre-stored, period the microcontroller UC registers in the non-volatile memory M a message of absence of response.

The mobile terminal cuts the second power supply channel and powers the gateway via the first power supply channel.

The mobile terminal 2 reads the response stored in the non-volatile memory M and displays corresponding information on its human-machine interface 20.

The mobile terminal cuts the first power supply channel.

In the third embodiment shown in FIG. 3B, the principle of operation is as follows:

The mobile terminal 2 is brought up to the communication gateway 1. It is for example fixed onto the support 101 provided. Via magnetic coupling between the reader/encoder 21 of the mobile terminal 2 and the antenna 12 of the first communication interface 10 of the communication gateway 1, the non-volatile memory M and the microcontroller UC are powered. The first power supply channel is therefore activated.

Once the communication gateway 1 is powered, the latter establishes the list of the devices with which it is able to communicate.

The mobile terminal 2 sends a request to the communication gateway 1 in order to obtain its unique identifier. In response to the request, the communication gateway 1 sends its unique identifier.

The mobile terminal 2 executes the software application associated with the unique identifier of the communication gateway 1.

The communication gateway 1 could potentially manage access rights on certain devices, taking into account the identifier of the mobile terminal 2 presented.

Using the software application executed on the mobile terminal 2 and via the first communication network R1, the mobile terminal writes a request into the non-volatile memory M of the communication gateway 1.

The non-volatile memory M sends an activation signal to the means 14 for managing the electrical energy, thus allowing the microcontroller and the second communication interface to be powered. The means 14 for managing the electrical energy then extracts the energy from the storage means 15 for the electrical energy recovered via the second power supply channel.

The mobile terminal 2 cuts the first power supply channel.
The means 14 for managing the electrical energy provides the supply of energy to the communication gateway.

The microcontroller UC of the communication gateway 1 reads the request written into the non-volatile memory M and transmits it to the external device 3 by sending a command to the second communication interface 11.

The second communication interface 11 sends a message to the external device via the second communication network R2 and subsequently switches into in a reception mode, waiting for a response.

The external device 3 generates a response and transmits it to the communication gateway 1 via the second communication network R2.

The response received by the second communication interface 11 is read by the microcontroller UC and written into the non-volatile memory M.

If no response is transmitted by the external device 3 at the end of a given, for example pre-stored, period the microcontroller UC registers in the non-volatile memory M a message of absence of response.

The microcontroller UC cuts the second power supply channel.

The mobile terminal 2 powers the communication gateway via the first communications channel.

The mobile terminal 2 reads the response stored in the non-volatile memory M and displays corresponding information on its human-machine interface 20.

The mobile terminal 2 cuts the first power supply channel.

The communication gateway 1 of the invention and the system including said communication gateway 1 offer numerous advantages, amongst which:

- the communication gateway requires neither connection components nor internal source of electrical power supply,
- the communication gateway 1 allows data to be exchanged with devices over a communication protocol not supported by the mobile terminal 2,
- the communication system does not require the deployment of any power supply cable,
- the communication gateway 1 may be adapted to various types of application and allows data to be exchanged with various devices by simply disposing of a mobile terminal equipped with an interface of the NFC or RFID type.

The solution of the invention could be employed in all types of applications requiring a communication between a mobile terminal 2 and devices communicating according to a protocol not supported by the mobile terminal 2.

The invention claimed is:

1. A communication gateway comprising:
   a first communication interface for communicating, over a first communication network, with a mobile terminal;
   a second wireless communication interface for communicating, over a second communication network, with at least one external device;
   electrical energy recovery means for recovering electrical energy supplied by the mobile terminal;
   a non-volatile memory powered by the electrical energy recovered; and
   a microcontroller connected to the non-volatile memory and configured to exchange data with the mobile terminal over the first communication network and with the external device over the second communication network, wherein
   the communication gateway includes the electrical energy recovery means, without including an electrical power supply source,
   the communication gateway is configured to be powered by the mobile terminal via a first power supply channel and a second power supply channel different from the first power supply channel,
   the communication gateway is configured to receive, from the mobile terminal and while powered via the first power supply channel, a request for the external device, and
   the communication gateway is configured to transmit, while powered via the second power supply channel and after the first power supply channel has been cut, the request to the external device.

2. The communication gateway as claimed in claim 1, wherein the first communication interface comprises an RF tag comprising an antenna and operating according to a near-field communications technology or of RFID type.

3. The communication gateway as claimed in claim 2, further comprising a support configured to receive the mobile terminal, the support incorporating the antenna.

4. The communication gateway as claimed in claim 2, wherein the non-volatile memory is included in the RF tag.

5. The communication gateway as claimed in claim 2, further comprising a power supply link between the RF tag, the microcontroller, and the second communication interface.

6. The communication gateway as claimed in claim 1, further comprising means for managing the electrical energy recovered by the electrical energy recovery means, the means for managing the electrical energy being configured to supply power to the microcontroller and the second communication interface.

7. The communication gateway as claimed in claim 6, wherein the electrical energy recovery means comprises a photovoltaic module and means for storing the electrical energy connected to the means for managing the electrical energy.

8. The communication gateway as claimed in claim 6, wherein the electrical energy recovery means comprises an antenna configured to supply power to the communication gateway by magnetic coupling.

9. The communication gateway as claimed in claim 1, wherein the second communication interface comprises an electronic circuit operating according to a protocol of the Zigbee or Zigbee Green Power type and an antenna connected to the electronic circuit.

10. A communication system comprising:
    a mobile terminal comprising a communication interface for communicating over a first communication network and a first electrical power supply interface and a second electrical power supply interface for providing a supply of electrical energy, the first electrical power supply interface being different from the second electrical power supply interface;
    at least one external device comprising a wireless communication interface for communicating over a second communication network; and
    a communication gateway including
       a first communication interface for communicating with the mobile terminal over the first communication network,
       a second wireless communication interface for communicating with the external device over the second communication network,
       means for recovering electrical energy supplied by the first electrical power supply interface and the second electrical power supply interface of the mobile terminal,
       a non-volatile memory powered by the electrical energy recovered, and
       a microcontroller connected to the non-volatile memory and configured to exchange data with the mobile terminal over the first communication network and with the external device over the second communication network, wherein
       the communication gateway includes the means for recovering electrical energy, without including an electrical power supply source,
       the communication gateway is configured to receive, from the mobile terminal and while powered via the first electrical power supply channel, a request for the external device, and
       the communication gateway is configured to transmit, while powered via the second electrical power supply channel and after the first electrical power supply channel has been cut, the request to the external device.

11. The communication system as claimed in claim 10, wherein the mobile terminal comprises a reader/encoder operating in near-field mode or in RFID mode.

12. The communication system as claimed in claim 10, wherein the non-volatile memory stores a unique identifier of the communication gateway and the mobile terminal associates a software application dedicated to controlling, reading, and/or monitoring of the external device with the unique identifier stored in the non-volatile memory of the communication gateway.

13. The communication system as claimed in claim 10, wherein the mobile terminal comprises a human-machine interface allowing controlling, reading, and/or monitoring of the external device.

14. The communication system as claimed in claim 10, wherein the external device comprises a sensor or a coordination unit connected to several sensors.

15. The communication system as claimed in claim 10, wherein the non-volatile memory is configured to store in memory a unique identifier of the mobile terminal and to associate access rights with the unique identifier.

16. A communication gateway comprising:
a first communication interface configured to communicate, over a first communication network, with a mobile terminal;
a second wireless communication interface configured to communicate, over a second communication network, with at least one external device;
an electrical energy recovery device configured to recover electrical energy supplied by the mobile terminal;
a non-volatile memory powered by the electrical energy recovered; and
a microcontroller connected to the non-volatile memory and configured to exchange data with the mobile terminal over the first communication network and with the external device over the second communication network, wherein the communication gateway includes the electrical energy recovery device, without including an electrical power supply source,
the communication gateway is configured to be powered by the mobile terminal via a first power supply channel and a second power supply channel that is different from the first power supply channel,
the communication gateway is configured to receive, from the mobile terminal and while powered via the first power supply channel, a request for the external device, and
the communication gateway is configured to transmit, while powered via the second power supply channel and after the first power supply channel has been cut, the request to the external device.

17. The communication gateway as claimed in claim 16, wherein the electrical energy recovery device includes an antenna configured to supply power to the communication gateway by magnetic coupling.

18. The communication gateway as claimed in claim 16, wherein the electrical power supply source corresponds to a battery.

19. The communication gateway as claimed in claim 16, wherein
the first communication interface includes an antenna that is incorporated in a support, which is configured to receive the mobile terminal, and
the non-volatile memory is configured to store in memory a unique identifier of the mobile terminal and to associate access rights with the unique identifier.

20. The communication gateway as claimed in claim 16, wherein the communication gateway is configured to be powered via the first power supply channel by magnetic coupling between a reader/encoder of the mobile terminal operating in near-field more or in RFID mode and the communication gateway, and the communication gateway is configured to be powered via the second power supply channel by magnetic coupling between a communications and power supply device of the mobile terminal and the communication gateway.

* * * * *